May 13, 1969

F. E. SAUMENIG 3,443,326

AUGER TYPE DITCHING MACHINE

Filed Feb. 24, 1966

INVENTOR
FREDERICK E. SAUMENIG

ATTORNEY

INVENTOR
FREDERICK E. SAUMENIG
ATTORNEY

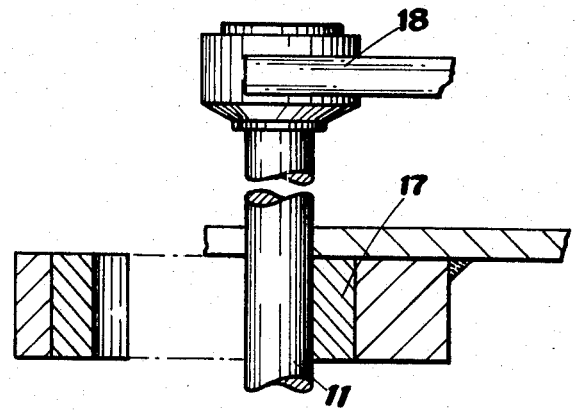
FIG. 6
FIG. 5
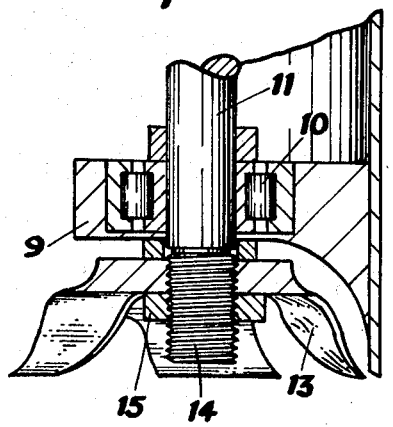
FIG. 8
FIG. 9
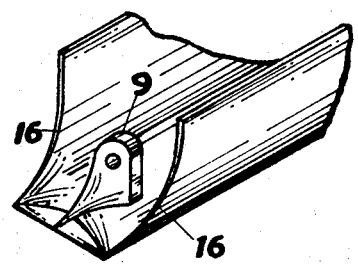
FIG. 10
INVENTOR
FREDERICK E. SAUMENIG
ATTORNEY

United States Patent Office 3,443,326
Patented May 13, 1969

3,443,326
AUGER TYPE DITCHING MACHINE
Frederick E. Saumenig, Pompano, Fla. (12 SE. 9th Ave., Deerfield Beach, Fla. 33441)
Filed Feb. 24, 1966, Ser. No. 529,839
Int. Cl. E02f 5/04
U.S. Cl. 37—81                               2 Claims

ABSTRACT OF THE DISCLOSURE

An excavating device powered by a tractor and including a trough having a rotary shaft therein with a cutter on the shaft at the forward end of the trough and a spiral conveyor on the shaft within the trough, the trough and shaft being pivotally connected to a frame at one extreme end of the tractor by an adjustable piston and cylinder device. Tubular conduits communicate with the rear end of the trough so that earth may be conveyed by the spiral conveyor to the conduits which discharge the earth on opposite sides of the excavating device. The shaft is driven from the tractor.

---

Figure 1:
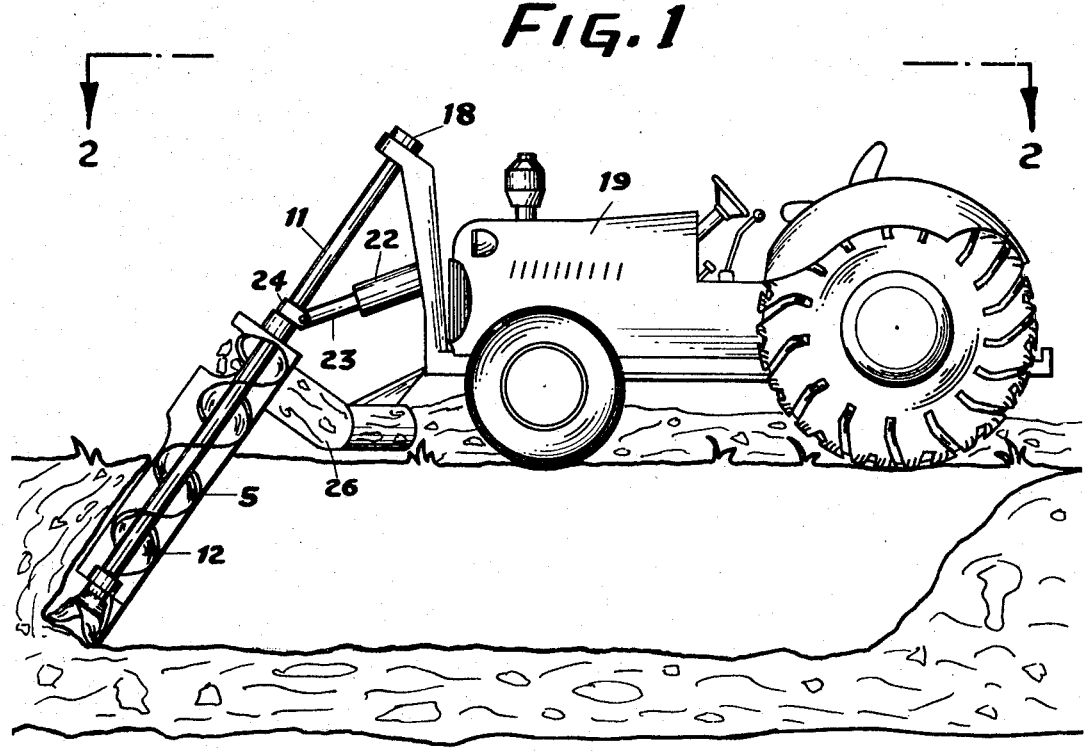

This invention relates to an excavating device for cutting ditches or other openings in the ground area for the subsequent installation of pipe or wiring.

The invention comprises a trough-like device having a round bottom and upstanding flat sides and with the device being provided with an elongated shaft, having an earth cutter upon its forward end and with the shaft being provided throughout its length with a spiral blade whereby to conduct the earth from the cutter throughout the length of the device and to eject the dirt through a pair of lateral tubular devices and with the shaft being power driven to continuously drive the cutter element throughout the forward movement of a drive device, such as a tractor and whereby the excavating device is continuously driven through the earth either angular or horizontal.

Novel features of construction and operation of the device will be more clearly apparent during the course of the following description, reference being had to the accompanying drawings wherein has been illustrated the preferred forms of the device and wherein like characters of reference are employed to denote like parts throughout the several figures.

Figure 2:
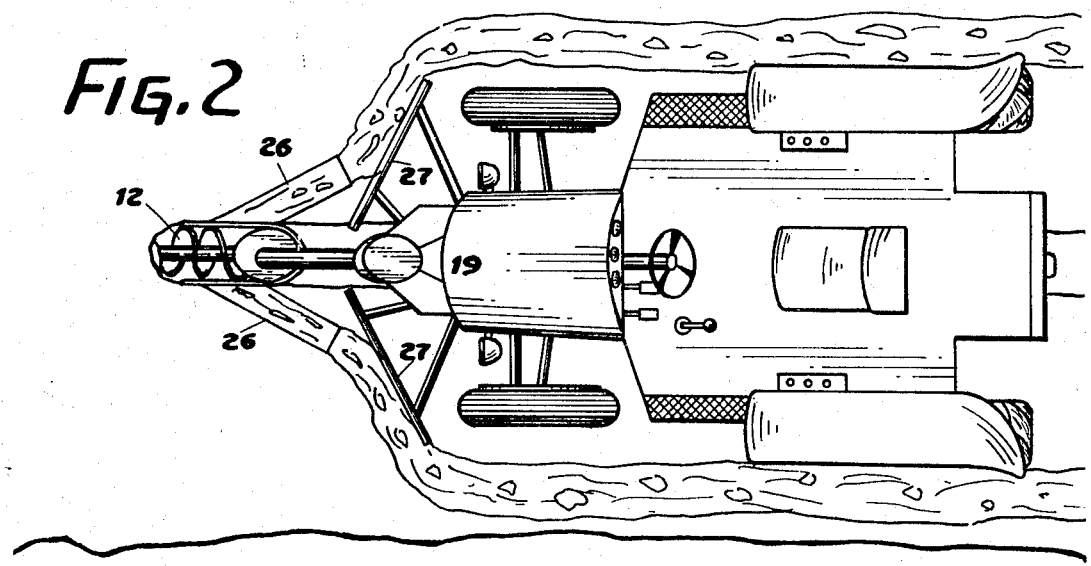
Figure 3:
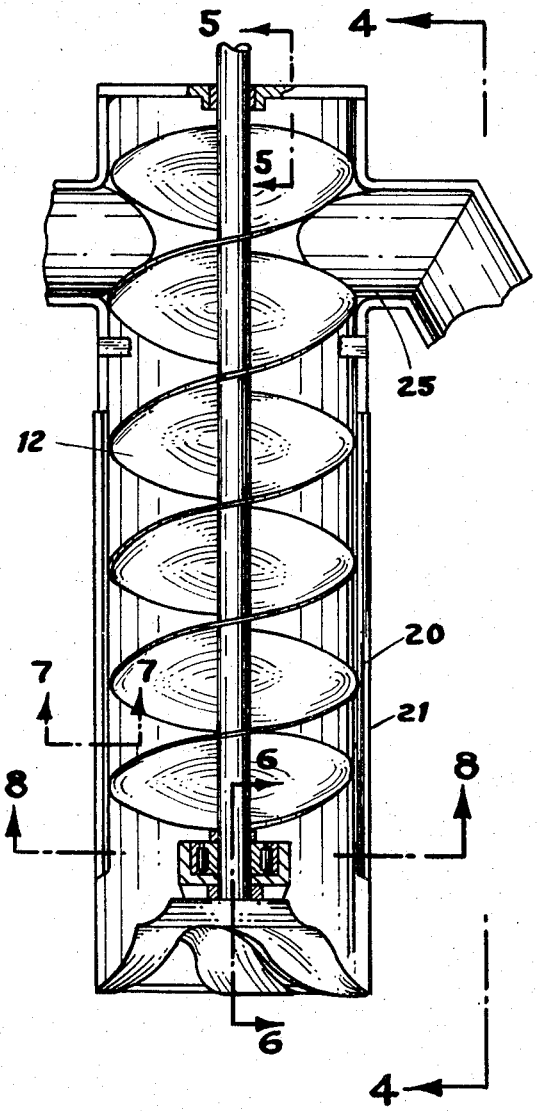
Figure 4:
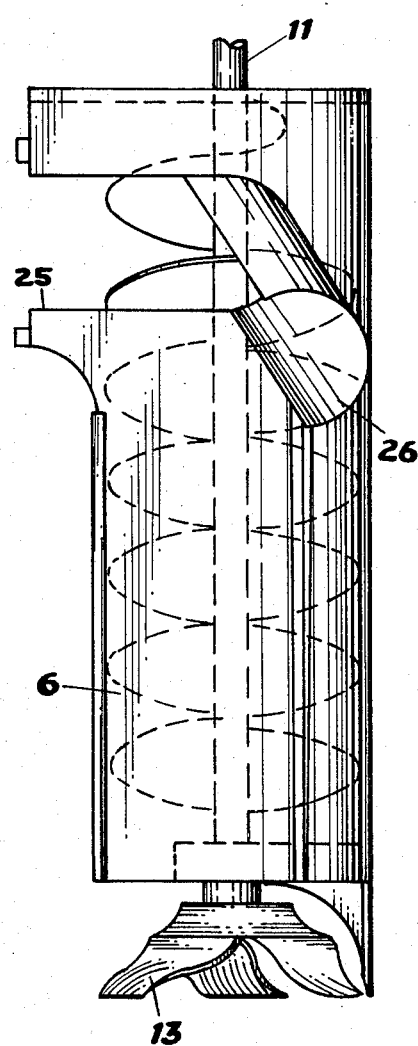
Figure 7:
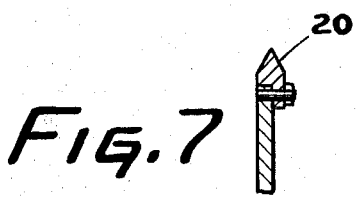

In the drawings:

FIGURE 1 is a side elevation of an excavating device constructed in accordance with the invention and being connected to the front portion of a power driven tractor, FIGURE 2 is a plan view thereof, FIGURE 3 is a top plan view of an excavating trough, parts being broken away for purpose of illustration, FIGURE 4 is a side elevation of the device illustrated in FIGURE 3, FIGURE 5 is a fragmentary section taken substantially on line 5—5 of FIGURE 3, FIGURE 6 is a longitudinal section taken substantially on line 6—6 of FIGURE 3, FIGURE 7 is a fragmentary sectional view taken on line 7—7 of FIGURE 3 and illustrating a reinforcing edge to the trough, FIGURE 8 is a transverse sectional view through the trough and associated mechanism, taken substantially on line 8—8 of FIGURE 3, FIGURE 9 is an elevational view of a modified form of cutter head, and FIGURE 10 is a fragmentary perspective view of a leading end of the excavating trough.

Referring specifically to the drawings, there has been illustrated a cutter element 5, comprising a trough 6 having a cylindrical bottom 7 and upstanding side walls 8.

The trough 6 is provided at its forward end with a fixed bearing block 9, carrying a roller bar 10 that rotatably receives a longitudinally extending shaft 11. The shaft 11 for the major length of the trough is provided with a spiral earth moving worm 12. Forwardly of the bearing block 9, the shaft is extended to receive a cutter head 13, The cutter is threaded upon the shaft 11, as indicated at 14 and held against displacement by a lock nut 15. The forward end of the trough 6 is beveled downwardly, forming side cutting blades 16, that terminate at the forward end of the curved bottom 7. The shaft 11, at the rear end of the trough is rotatable in a bearing 17 and the shaft, as extended beyond the rear end of the shaft is provided with a drive coupling 18, that is driven as by means of a shaft or shafts from a source of power, such as the forward drive connection of a conventional tractor device 19. The trough 6 upon its upper marginal edge is provided with reinforcing members 20. The trough 6 adjacent its bottom 7 is also provided with reinforcing bars 21. Trough 6 may be anchored to a coupling bracket 24.

The trough 6, when attached to the tractor 19 is adjustable angularly by a cylinder 22, having a piston rod 23 extending therefrom and connected to the shaft 11 by coupling bracket 24 and whereby the shaft and the trough may be disposed at any desirable angularity, both with respect to a horizontal cut or various degrees of angular cuts. Cylinder 22 and shaft 11 are pivotally connected to the tractor frame, and rod 23 is pivotally connected to coupling bracket 24. The trough 6 adjacent its rear end is cut away vertically, as indicated at 25 and has connected thereto lateral discharge conduits 26, that tend to receive the dirt moved upwardly and rearwardly by the spiral 12, to be discharged laterally of the trough at a point outwardly of the propelling device 19, baffle plates 27 may be mounted upon the forward end of the propelling device 19 to prevent the dirt from being discharged in a position to interfere with the proper rolling of the wheels of the propelling device 19. Conduits 26 may angle rearward as in FIGURE 2 or forward as in FIGURES 3 and 4.

In FIGURE 9, there has been illustrated a modified form of cutter device, being a spiral 28, having cutting teeth 29 and a screw type spindle 30. The cutter 28 is employed in any particular type of ground surface that is difficult to remove by the cutter 13. This device may be screwed on threads 14 to replace the cutter 13.

The outstanding features of this invention are as follows:

(1) The major feature of this invention is worming a ditch through the use of a trough, with beveled sharp edges and a cutting blade at the bottom.

(2) Another important factor in worming in front of a tractor is to enable the laying of either pipe or wire attached to its rear.

(3) Also to have lathes on front of tractor to spread the excavated dirt from the ditch so as to produce a smooth runway for the tractor.

(4) The degree of depth to be cut is maintained by the stabilizing rod 22 that is set in a stationary position.

(5) A further advantage of this device is in the form of the worm for the length of the trough and could be expanded in size to excavate banks of dirt in road building and also to the point of drilling tunnels.

(6) The head blades or cutter form a trough or tunnel and the worm itself as well as the trough is preferably formed of case hardened steel as is also the cutter blade 13 whereby to facilitate the cutting, through rock or the like.

The device is simple in construction, is strong, durable, relatively cheap to manufacture and most effective as a means for cutting ditches, tunnels or the like and is adaptable to connection to the driving device, such as the tractor 19.

I claim:
1. An excavating device powered by a tractor having a frame at one extreme end thereof for supporting the device in a position spaced longitudinally from all wheels of the tractor, said excavating device comprising a semi-cylindrical trough having sharp longitudinal edges for cutting into earth, bearings mounted in opposite ends of said trough, a rotary shaft extending through said trough and journalled in said bearings, adjustable means pivotally connecting said trough and said shaft to said frame with said sharp edges of said trough oriented to bite into earth when in a vertical position, said adjustable means including a piston and cylinder device pivotally connected to said frame and to a rear end of said trough and extensible and contractible to swing said trough and shaft to position the same, spiral conveyor means mounted on said shaft between said bearings for conveying excavated material toward the rear end of said trough, a cutter head affixed to said shaft at and within the forward end of said trough for cutting into earth and supplying the same to said conveying means, drive means coupling said shaft to a power outlet of the tractor for rotating said shaft, and tubular conduits communicating with the rear end of said trough and extending laterally therefrom so that earth may pass directly from the trough through said conduits to be discharged at opposite sides of said excavating device.

2. The excavating device as claimed in claim 1 in which said device and frame are mounted at the front of said tractor and said conduits terminate short of the lateral extremities of said tractor, said tractor being provided with baffles to force material discharged from said conduits laterally away from said tractor.

References Cited

UNITED STATES PATENTS

| 799,753 | 9/1905 | O'Connor | 37—82 |
|---|---|---|---|
| 814,982 | 3/1906 | Nixon | 37—81 |
| 847,703 | 3/1907 | Shenefelt | 37—81 |
| 1,071,477 | 8/1913 | Stowe | 37—82 XR |
| 2,430,048 | 11/1947 | Engel et al. | 37—81 |
| 2,598,350 | 5/1952 | Carroll | 37—81 |

FOREIGN PATENTS

| 69,152 | 6/1915 | Germany. |
|---|---|---|
| 93,242 | 1/1959 | Norway. |

ROBERT E. PULFREY, *Primary Examiner.*

CLIFFORD D. CROWDER, *Assistant Examiner.*

U.S. Cl. X.R.

37—189